United States Patent [19]

Takagi et al.

[11] 4,447,579

[45] May 8, 1984

[54] EPOXY RESIN ADHESIVE COMPOSITIONS

[75] Inventors: Yasuo Takagi, Chiba; Michiharu Horibe, Kamagaya, both of Japan

[73] Assignees: Cemedine Co., Ltd.; Tohto Kasei Co., Ltd., both of Tokyo, Japan

[21] Appl. No.: 370,090

[22] Filed: Apr. 20, 1982

[30] Foreign Application Priority Data

Apr. 27, 1981 [JP] Japan .................... 56-64518

[51] Int. Cl.$^3$ .................... C08F 8/32; C08L 63/10
[52] U.S. Cl. .................... 525/113; 525/122; 525/911
[58] Field of Search .................... 525/911, 113, 122

[56] References Cited

U.S. PATENT DOCUMENTS

| | | | |
|---|---|---|---|
| 3,635,860 | 1/1972 | Salensky | 525/122 |
| 3,823,107 | 7/1974 | Cotton | 525/911 |
| 4,025,578 | 5/1977 | Siebert | 525/113 |
| 4,055,541 | 10/1977 | Riew | 525/911 |
| 4,088,708 | 5/1978 | Riew | 525/113 |
| 4,260,700 | 4/1981 | Cassutt et al. | 525/113 |

Primary Examiner—John C. Bleutge
Assistant Examiner—Robert E. L. Sellers
Attorney, Agent, or Firm—Frishauf, Holtz, Goodman & Woodward

[57] ABSTRACT

The present invention relates to a room temperature curable epoxy resin adhesive composition having excellent T-peel strength, comprising an epoxy resin containing more than one epoxy group in a molecule on an average, and a hardener in the form of a polyamideamine, which is obtained from reaction of polyamine with diene rubber having carboxyl terminal groups and other compound having carboxyl groups.

17 Claims, No Drawings

EPOXY RESIN ADHESIVE COMPOSITIONS

The present invention relates to improvements in epoxy resin adhesives containing epoxy resins and polyamide-amines as hardeners, and more particularly to epoxy resin adhesive compositions which can be hardened at room temperature and are characterized by improved T-peel strength, without sacrificing thereto tensile lap shear strength.

Conventional epoxy resin adhesives have a disadvantage that, due to a lack of flexibility, they to not have enough T-peel strength, although they have excellent tensile and tensile lap shear strength.

A method of overcoming this disadvantage is described in the West German Offenlegungsschrift No. 2,158,878, in which a mixture of a polyamide-amine and 1,4-cispolybutadiene is used as a hardener. Another method of overcoming the above-mentioned disadvantage is described in the West German Offenlegungsschrift No. 2,216,786, in which a mixture of polyamide-amine and polychloroprene is used as a hardener. Although an adhesive comprising an epoxy resin and either of the above-mentioned two mixtures is characterized by improved T-peel strength, it cannot be hardened unless it is heated to temperatures above 120° C.

In case of another prior art described in the Japanese laid-open patent application No. 51-97640, an adhesive comprising an epoxy resin, polychloroprene and nonylphenol is hardened by a hardener which is a mixture of a polyamide-amine, polyamine and metallic oxide. This adhesive also has to be heated to 80° C. for hardening, and an improved T-peel strength is obtained only at the sacrifice of tensile lap shear strength.

Another prior art described in the Japanese laid-open patent application No. 47-32098, discloses an hardener comprising polyamine and reaction product of acrylonitrile-butadiene rubber having carboxyl terminated groups with polyamine. This hardener have disadvantage to reduce tensile and tensile lap shear strength by lack of solubility in each other in case of using as the hardener in the adhesive composition. Still another prior art described in the Japanese notified patent application No. 54-30414 relates to a newly-developed two-part system of liquid polyurethane adhesive for structural use. This adhesive, which is produced by reacting a polyurethane prepolymer with an epoxy resin to be homogenized state, cannot be hardened, either, unless it is heated to temperatures above 120° C.

According to yet still another prior art described in the Japanese laid-open patent application No. 49-126798, acrylonitrile butadiene rubber having carboxyl terminated groups is allowed to react on epoxy resin and then the product of reaction is homogenized. Although the adhesive thus produced can be hardened by a polyamide-amine at room temperature, aluminum alloy sheets have to be treated with bichromate/sulfuric acid according to FPL method in order to get sufficient T-peel strength for aircraft.

An intensive study, which was made by the present inventors to improve an adhesive composition of the type mentioned in the opening paragraph of this specification, has led to the findings that a hardener having amino terminated groups is obtained when diene rubber having carboxyl groups in each molecule and other compound having carboxyl groups are allowed to react with polyamine and that an epoxy resin adhesive containing such a hardener can be hardened at room temperature and yet has excellent tensile lap shear strength and T-peel strength.

This room temperature curable epoxy resin adhesive composition is characterized in that it comprises an epoxy resin which contains more than one epoxy group in a molecule on an average, and a hardener in the form of a polyamide-amine, which is obtained from reaction of polyamine with diene rubber having carboxyl terminal groups and other compound having carboxyl groups.

Any of the various epoxy resins which are in common use in ordinary epoxy resin compositions can be used for the epoxy resin adhesive composition of the present invention. Epoxynovolak such as polyorthocresol formaldehyde poly(2,3-epoxypropyl)ether or polyphenol formaldehyde poly(2,3-epoxypropyl)ether, epoxy resins obtained from the reaction of bisphenol A or resorcinol and epihalohydrin serve as the examples of epoxy resins which can be used for the epoxy resin adhesive composition of the present invention. Further epoxidated polyolefine and an epoxy resin derived from phthalic anhydride and epihalohydrin serve as another examples.

A polyamide-amine to be used for the epoxy resin adhesive composition of the present invention is a condensation product obtained by heating, to a high temperature, from polyamine, diene rubber having carboxyl groups and other compound having carboxyl groups. Various diene rubbers such as acrylonitrilebutadiene rubber, polybutadiene rubber, polyisoprene rubber or polychloroprene, having carboxy groups in each molecule can be used for this purpose. Compounds having carboxyl groups such as adipic acid, phthalic acid, tall acid or polymerized fatty acid, for example synthetic dimer acid, can be used or this purpose. "Polymerized fatty acid" as termed in this context means the products obtained from the dimerization or trimerization of unsaturated monomer acids such as linoleic acid contained in natural tall oil, soybean oil, cotton seed oil, rice bran oil, dehydrated castor oil, etc.

Various polyamines such as aliphatic polyamine, modified alphatic polyamine, aromatic polyamine, modified aromatic polyamine, alicyclic polyamine, modified alicyclic polyamine, polyamide-amine, modified polyamide-amine, heterocyclic polyamine or modified heterocyclic polyamine, can be used singly or in combination for constituting the above-mentioned condensation reaction together with diene rubber having carboxyl groups and other compound having carboxyl groups.

The ratio of above three components may be varied widely, but it is desirable to use said diene rubber in a ratio of 3–60 wt. % of total components and to use said polyamine in a ratio of 1.0–3.0 equivalents against 1.0 equivalent of total of said diene rubber and said other compound having carboxyl groups, in order to obtain sufficient viscosity and adhesive properties.

A hardener to be used for the epoxy resin adhesive composition of the present invention may contain aliphatic polyamine, modified aliphatic polyamine, aromatic polyamine, modified aromatic polyamine, alicyclic polyamine, modified alicyclic polyamine, polyamide-amine, modified polyamide-amine, heterocyclic polyamine or modified heterocyclic polyamine in addition to a polyamide-amine of the present invention.

The amount of a hardener is calculated stoichiometrically on the basis of the amount of active hydrogen contained in the hardener. In practice, however, the hardener may be used in such an amount that 0.4 to 2.0 equivalents thereof, preferably 0.7 to 1.3 equivalents thereof, is allowed to combine with each epoxy group contained in the epoxy resin.

An extender, filler and/or reinforcing agent such as coal tar, bitumen, fibers, silicates, mica, powdered quartz, calcium carbonate, talc, titanium dioxide, clay or metal powder may be added to the epoxy resin adhesive composition of the present invention at any stage prior to the hardening. A plasticizer, organic solvent, leveling agent, synthetic resin, coloring agent such as pigment or dyestuff; and/or flame resistant agent such as antimony trioxide may be mixed with the epoxy resin adhesive composition of the present invention also at any stage prior to the hardening.

Irrespective as to whether the epoxy resin adhesive composition of the present invention is used as a hot-setting adhesive or a room temperature curable adhesive, it has an excellent adhesive property even when applied to the metal or rigid plastics, affords much higher reliability than the conventional epoxy resin adhesives, and thereby adapts itself to the structural adhesive use for aircrafts and automobiles.

A vertical type high-speed agitator, kneading machine, roll mill, ball mill, or any other suitable mixing and agitating machine may be used for dispersion of the components of which the epoxy resin adhesive composition of the present invention is to be made up.

The following examples and controls demonstrate preferred conditions for preparing the epoxy resin adhesive compositions of the present invention. Except as otherwise specified, "parts" and "%" mean parts by weight and % by weight, respectively.

KINDS OF HARDENERS

Hardener A

A mixture of 514 parts of polymerized fatty acid containing 3% monomer, 75% dimer and 22% trimer prepared from linoleic acid, 203 parts of tall oil fatty acid and 384 parts of tetraethylene pentamine was gradually heated while it was stirred well. The water formed was taken out of the system of reaction. The mixture was allowed to stand for two hours at 230° C. Then the reaction was allowed to proceed for another one hour under a reduced pressure of 300 mmHg. Then the internal pressure of the reaction vessel was normalized by allowing nitrogen gas to flow into it, and 136 parts of Hycar CTBN 1300×8, which is butadiene-acrylonitrile rubber having carboxyl groups in an amount of 0.052 EPHR (Equivalent Per Hundred Rubber) manufactured by B. F. Goodrich Chemical Co. of the United States, was gradually added. Then the mixture was allowed to stand for another two hours at 180° C. so that copolycondensation might be completed. A brown liquid resin with a total amine number of 268, a viscosity of 11.0 Pascal.sec/40° C., and an acid value of 1.9 was obtained.

Hardener B

Synthesized in the same manner as hardener A except that Hycar CTB 2000×162, which is polybutadiene having carboxyl terminated groups in an amount of 0.045 EPHR manufactured by B. F. Goodrich Chemical Co. of the United States, was used in place of Hycar CTBN 1300×8. A brown liquid resin with a total amine number of 265, a viscosity of 8.5 Pascal.sec/40° C., and an acid value of 1.3 was obtained.

Hardener C

Synthesized in the same manner as hardener A except that Denka LCR C-050, which is polychloroprene having carboxyl terminated groups in an amount of 0.033 EPHR manufactured by Denkikagaku Kogyo Co. of Japan, was used in place of Hycar CTBN 1300×8. A brown liquid resin with a total amine number of 254, a viscosity of 4.2 Pascal.sec/40° C., and an acid value of 2.2 was obtained.

Hardener D

Synthesized in the same manner as hardner A except that Kuraprene LIR-410, which is polyisoprene having carboxyl groups in an amount of 0.051 EPHR manufactured by Kurare Isoprene Chemical Co. Ltd. of Japan, was used in place of Hycar CTBN 1300×8. A brown liquid resin with a total amine number of 264, a viscosity of 87.4 Pascal.sec/40° C., and an acid value of 2.0 was obtained.

Hardener E

A mixture of 523 parts of polymerized fatty acid containing 3% monomer, 75% dimer and 22% trimer, 168 parts of tall oil fatty acid and 411 parts of tetraethylene pentamine was gradually heated while it was stirred well. The water formed was taken out of the system of reduction. The mixture was allowed to stand for two hours at 230° C. Then the reaction was allowed to proceed for another one hour under reduced pressure of 300 mmHg. A brown liquid resin with a total amine number of 330, a viscosity of 12 Pascal.sec/25° C., and an acid value of 1.6 was obtained.

EXAMPLES 1 to 4 and CONTROL 1

Epi Tohto YD-128, which is an epoxy resin manufactured by Tohto Kasei Co. Ltd. and falls under bisphenol A type with an epoxy equivalent of 5.15 to 5.43 meq/g and a viscosity of 11 to 14 Pascal.sec/25° C. (hereinafter called "epoxy resin I"), was blended with 50% to 130% of stoichiometrically measured one equivalent of hardener A. Test pieces were made by adhering two sheets of cold-rolled steel (JIS G 3141 SPCC) which were washed with vaporized trichlene and sandblasted with Emery No. 180 after washing, using the above-described mixture of epoxy resin I and hardener A. Curing conditions were 7 days at 20°±1° C. and 65±5% of respective humidity. Tensile lap shear strength (according to JIS K 6850) and T-peel strength (according to JIS K 6854) were measured on each pieces. Examples 1 to 4 of Table 1 show the results of these measurements. Control 1 of Table 1 was conducted in the same manner as examples 1 to 4 except that the cold-rolled steel sheets were stuck on each other by means of a mixture of epoxy resin I and Hardener E, i.e., by means of an adhesive which did not contain diene rubber.

TABLE 1

| | T-peel strength and tensile lap shear strength, measured with adhesives containing hardener A. | | | | | |
|---|---|---|---|---|---|---|
| | Epoxy resin I (parts) | Hardener E (parts) | Hardener equivalent (parts) | Mixing ratio (% by strength lent) | Tensile lap shear strength (N/mm$^2$) | T-peel (N/cm) |
| Example 1 | 100 | 50 | | 51.3 | 21.0 | 26.6 |

TABLE 1-continued

T-peel strength and tensile lap shear strength, measured with adhesives containing hardener A.

| | Epoxy resin I (parts) | Hardener E (parts) | Hardener A equivalent (parts) | Mixing ratio (% by strength lent) | Tensile lap shear strength (N/mm²) | T-peel (N/cm) |
|---|---|---|---|---|---|---|
| Example 2 | 100 | 70 | | 71.9 | 22.8 | 41.2 |
| Example 3 | 100 | 100 | | 102.7 | 22.0 | 41.9 |
| Example 4 | 100 | 130 | | 133.5 | 21.6 | 25.5 |
| Control 1 | 100 | | 60.5 | 100.0 | 17.2 | 1.2 |

It is noted from Table I that the T-peel strength exhibited by the adhesives of examples 1 to 4 was more than 20 times as high as that exhibited by the adhesive of control 1 and that the tensile lap shear strength was also improved to some extent.

EXAMPLES 5 to 9

The epoxy resin component of the adhesive composition used in example 5 comprises epoxy resin I alone, while the epoxy resin components of the adhesive compositions used in examples 6 to 8 comprised epoxy resin I and Epiclon 830 of Dainippon Ink Co., Ltd. of Japan, which is polyphenol formaldehyde poly (2,3-epoxypropyl)ether with an epoxy equivalent of 5.71 meq/g and a viscosity of 3 to 4 Pascal.sec/25° C. (hereinafter called "epoxy resin II"). The epoxy resin component of the adhesive composition used in example 9 comprised epoxy resin II alone. All of these adhesive compositions contained hardener A. As shown in Table 2, the characteristics of adhesion of these adhesive compositions, which were measured in the same manner as in examples 1 to 4, were as excellent as those exhibited by adhesives of examples 1 to 4.

EXAMPLES 10 AND 11

The epoxy resin components of the adhesive compositions used in Examples 10 and 11 comprised epoxy resin I and Shodyin 540 of Showa Denko Co., Ltd of Japan, which is diglycidylhexahydrophthalate with an epoxy equivalent of 6.25 to 6.90 meq/g and a viscosity of 0.2 to 0.4 Pascal.sec/25° C. (hereinafter called "epoxy resin III"). These adhesive compositions contained hardener A. As shown in Table 2, the characteristics of adhesion of these adhesive compositions, which were measured in the same manner as in examples 1 to 4, were as excellent as those exhibited by the adhesives of examples 1 to 4.

EXAMPLES 12 to 14

The epoxy resin components of the adhesive compositions used in examples 12 to 14 comprised epoxy resin I and Glycirol ED 503 of Asahi Denka Industry Co., Ltd. of Japan, which is 1,6-hexanediol diglycidylether with an epoxy equivalent of 5.88 to 6.25 meq/g and a viscosity of 20 to 30 milli Pascal.sec/25° C. (hereinafter calles "epoxy resin IV"). These adhesive compositions contained hardener A. As shown in Table 2, the characteristics of adhesion of these adhesive compositions, which were measured in the same manner as in examples 1 to 4, were as excellent as those exhibited by the adhesives of examples 1 to 4.

EXAMPLES 15 TO 16

The epoxy resin components of the adhesive compositions used in examples 15 and 16 comprised epoxy resin I and Epo Tohto YH 301 of Tohto Kasei Co., Ltd. of Japan, which is trimethylolpropane triglycidylether with an epoxy equivalent of 6.06 to 6.90 meq/g and a viscosity of 0.18 to 0.22 Pascal.sec/25° C. (hereinafter called "epoxy resin V"). These adhesive composition contained hardener A. As shown in Table 2, the characteristics of adhesion of these adhesive compositions, which were measured in the same manner as in examples 1 to 4, were as excellent as those exhibited by the adhesives of examples 1 to 4.

TABLE 2

Characteristics of adhesion properties of various epoxy resins blended with Hardener A

| Example | Epoxy resin (parts) | | | | | Epoxy equivalent (meq/g) | Hardener A (parts) | Tensile lap shear strength (N/mm²) | T-peel strength (N/cm) |
|---|---|---|---|---|---|---|---|---|---|
| | I | II | III | IV | V | | | | |
| 5 | 100 | | | | | 5.26 | 82.7 | 23.5 | 41.2 |
| 6 | 75 | 25 | | | | 5.38 | 84.6 | 26.1 | 36.1 |
| 7 | 50 | 50 | | | | 5.49 | 86.3 | 27.1 | 29.4 |
| 8 | 25 | 75 | | | | 5.60 | 88.1 | 26.0 | 33.7 |
| 9 | | 100 | | | | 5.71 | 89.8 | 24.5 | 35.3 |
| 10 | 75 | | 25 | | | 5.59 | 87.4 | 23.1 | 37.2 |
| 11 | 50 | | 50 | | | 5.92 | 92.1 | 26.2 | 36.1 |
| 12 | 95 | | | 5 | | 5.30 | 83.3 | 23.4 | 36.1 |
| 13 | 90 | | | 10 | | 5.34 | 84.0 | 21.8 | 29.4 |
| 14 | 80 | | | 20 | | 5.42 | 85.2 | 21.1 | 34.5 |
| 15 | 75 | | | | 25 | 5.56 | 87.4 | 24.8 | 29.8 |
| 16 | 50 | | | | 50 | 5.86 | 92.1 | 22.3 | 26.3 |

Note:
In any examples 5 to 16, the mixing ratio of hardener A was 85% by equivalent.

CONTROLS 2 TO 5

Nipol 1312 of Nippon Zeon Co. Ltd. of Japan (Viscosity: 100 Pascal.sec/30° C.), which is fluid acrylonitrile butadiene rubber devoid of functional groups, was selected from among the conventional agents for providing synthetic resins with flexibility. The composition used in control 1 was mixed with this agent in three different mixing ratios, so that three different epoxy resin adhesives were obtained. Then the characteristics of adhesion of these epoxy resin adhesives were measured in the same manner as in examples 1 to 4. In control 5, Hycar ATBN 1300×16 which is acrylonitrile-butadiene rubber having amino terminal groups and a viscosity 190 Pascal.sec/27° C., manufactured by B. F.

Goodrich Chemical Co. was added to the composition used in control 1 as the agents for providing flexiblity. The characteristics of adhesion of this epoxy resin adhesive was measured in the same manner as in examples 1 to 4. The results of the measurements shown in Table 3 leave much to be desired, with unimproved T-peel strength and low tensile lap shear strength.

TABLE 3

Characteristics of adhesion properties measured with adhesives containing an agent for providing synthetic resins with flexibility

| Control | Epoxy resin I (parts) | Hardener E (parts) | Agent for providing synthetic resins with flexibility (parts) | Tensile lap shear strength (N/mm²) | T-peel strength (N/cm) |
|---|---|---|---|---|---|
| 2 | 100 | 60.5 | 10 | 11.9 | 1.2 |
| 3 | 100 | 60.5 | 20 | 9.5 | 1.6 |
| 4 | 100 | 60.5 | 30 | 6.5 | 2.3 |
| 5 | 100 | 60.5 | 12* | 2.3 | 0.9 |

Note:
*ATBN 1300 × 16
In any of controls 2 to 5, the mixing ratio of hardener E was 100% by equivalent.

EXAMPLES 17 TO 19 AND CONTROL 6

In place of hardener A, hardeners B, C, D and E were used in the epoxy resin adhesives of examples 17 to 19 and control 6, respectively, and the characteristics of adhesion of these epoxy resin adhesives were measured in the same manner as in examples 1 to 4. Table 4 shows the results of the measurements, from which it is noted that, as compared with the adhesive of control 6 which did not contain diene rubber, the adhesives of examples 17 to 19 showed a drastic improvement in the T-peel strength in addition to some extent of improvement in the tensile lap shear strength.

TABLE 4

Characteristics of adhesion properties measured with adhesives containing hardeners B, C, D and E

| | Epoxy resin I (parts) | Hardener (parts) B | C | D | E | Tensile lap shear strength (N/mm²) | T-peel strength (N/cm) |
|---|---|---|---|---|---|---|---|
| Example 17 | 100 | 100 | | | | 18.1 | 9.3 |
| Example 18 | 100 | | 100 | | | 20.1 | 28.7 |
| Example 19 | 100 | | | 100 | | 19.5 | 15.4 |
| Control 6 | 100 | | | | 60.5 | 16.8 | 1.5 |

Note:
In any of the adhesives mentioned in Table 4, the mixing ratio of a hardener was 100% by equivalent.

EXAMPLES 20 TO 22

The steel sheets were treated in the same manner as those used in example 1, and were stuck on each other at 20° C. by means of three different adhesives. Table 5 shows the composition of each of these adhesives. Then the steel sheets were allowed for 7 days, and then used as test pieces in a measurement of various physical properties. Table 6 shows the parameters studied and the results of the measurement.

Table 7 shows the tensile lap shear strength measured at 20° C. with various materials other than cold-rolled steel.

TABLE 5

Composition of adhesives

| | Epoxy resin | | Hardener | |
|---|---|---|---|---|
| Example 20 | Epoxy resin I: | 40 parts | Hardener A: | 100 parts |
| | Epoxy resin II: | 60 parts | | |
| Example 21 | Epoxy resin I: | 40 parts | Hardener A: | 100 parts |
| | Epoxy resin II: | 60 parts | Resin Grade* RG-244: | 3 parts |
| | Resin Grade* RG-244: | 3 parts | | |
| Example 22 | Epoxy resin I: | 40 parts | Hardener A: | 100 parts |
| | Epoxy resin II: | 60 parts | Crystalite** A-1 | 100 parts |
| | Crystalite** A-1: | 100 parts | | |
| | Resin Grade* RG-244: | 2 parts | Resin Grade* RG-244: | 2 parts |

Note:
*Asbestos short fiber of Union Carbide and Barbon in U.S.
**Fine powdered silica of Tatsumori Co. in Japan

TABLE 6

Various physical properties measured with adhesives

| | Example 20 | 21 | 22 |
|---|---|---|---|
| Compressive shear strength (JIS K 6852) (N/mm²) | 37.5 | 36.8 | 40.5 |
| Tensile strength (JIS K 6849) (N/mm²) | 36.6 | 37.5 | 42.8 |
| Cleavage strength (JIS K 6853) (N/25mm) | 7640 | 7997 | 8085 |
| Impact shear strength (JIS K 6855) (J/cm²) | 5.5 | 4.9 | 4.4 |
| T-peel strength | | | |
| (JIS K 6854) (N/25mm) at −20° C. | 51.9 | 42.1 | 39.2 |
| (JIS K 6854) (N/25mm) at 20° C. | 101.9 | 100.0 | 89.2 |
| (JIS K 6854) (N/25mm) at 80° C. | 25.5 | 27.4 | 23.5 |
| Tensile lap shear strength | | | |
| (JIS K 6850) (N/mm²) at −20° C. | 21.2 | 20.8 | 20.5 |
| (JIS K 6850) (N/mm²) at 20° C. | 23.7 | 22.6 | 21.6 |
| (JIS K 6850) (N/mm²) at 150° C. | 2.1 | 2.4 | 3.7 |

TABLE 7

Tensile lap shear strength measured at 20° C. with various materials

| Material | Example 20 | 21 | 22 |
|---|---|---|---|
| Stainless steel | 22.2 | 18.5 | 21.1 |
| Aluminium | 12.7 | 12.0 | 12.4 |
| Copper | 10.2 | 7.7 | 9.6 |
| Rigid polyvinyl chloride resin | 4.1* | 4.0* | 4.2* |
| Polycarbonate | 3.0 | 3.0 | 4.1* |
| Phenolic resin | 7.4* | 6.6* | 6.5* |
| Glass fiber reinforced plastic | 8.0 | 7.6 | 9.4* |
| Wood (birch)** | 19.2* | 18.1* | 18.7* |
| Wood (beech)** | 14.7* | 14.6* | 15.5* |
| Dry concrete** | 10.3* | 7.9* | 6.4* |
| Wet concrete** | 6.0* | 4.6* | 4.1* |
| Glass** | 17.7* | 14.4* | 17.5* |

Note:
Unit: N/mm²
Figures marked with * in Table 7 denote breaking loads of materials.
Measurement marked with ** in Table 7 denotes compressive shear strength.

What is claimed is:
1. A room temperature curable epoxy resin adhesive composition having excellent T-peel strength, comprising an epoxy resin containing an average of more than one epoxy group per molecule and a polyamide-amine hardener which is obtained by the reaction of a diene rubber having terminal carboxyl groups and the reaction product of an aliphatic polyamine and one or two compounds containing carboxyl groups selected from the group consisting of tall acid and polymerized fatty acid.

2. The room temperature curable epoxy resin adhesive composition as set forth in claim 1, wherein said diene rubber component is a copolymer formed from acrylonitrile and butadiene.

3. The room temperature curable epoxy resin adhesive composition as set forth in claim 1, wherein said diene rubber component is a polybutadiene.

4. The room temperature curable epoxy resin adhesive composition as set forth in claim 1, wherein said diene rubber component is a polychloroprene.

5. The room temperature curable epoxy resin adhesive composition as set forth in claim 1, wherein said diene rubber component is a polyisoprene.

6. The room temperature curable epoxy resin adhesive composition as set forth in claim 1, wherein said compound containing carboxyl groups is a polymerized fatty acid.

7. The room temperature curable epoxy resin adhesive composition as set forth in claim 1, wherein said diene rubber component is in a ratio of 3–60 wt.% of total components of said polyamide-amine and said polyamine is in a ratio of 1.0–3.0 equivalents against 1.0 equivalent of total of said diene rubber component and said compound containing carboxyl groups component.

8. The room temperature curable epoxy resin adhesive composition as set forth in claim 1, wherein the mixing ratio of said hardener in the form of a polyamide-amine to said epoxy resin is 0.4:1 to 2.0:1 by equivalent.

9. The room temperature curable epoxy resin adhesive composition as set forth in claim 1, wherein said epoxy resin is a glycidyl ether epoxy resin or a glycidyl ester epoxy resin.

10. The room temperature curable epoxy resin adhesive composition as set forth in claim 1, wherein said compound containing carboxyl groups is tall acid.

11. The room temperature curable epoxy resin adhesive composition as set forth in claim 7, wherein the mixing ratio of said hardener in the form of a polyamide-amine to said epoxy resin is 0.4:1 to 2.0: by equivalent.

12. The room temperature curable epoxy resin adhesive composition as set forth in claim 11, wherein said epoxy resin is a glycidyl ether epoxy resin or a glycidyl ester epoxy resin.

13. The room temperature curable epoxy resin adhesive composition as set forth in claim 12, wherein said compound containing carboxyl groups is tall oil or polymerized fatty acid.

14. The room temperature curable epoxy resin adhesive composition as set forth in claim 13, wherein said diene rubber component is a copolymer formed from acrylonitrile and butadiene.

15. The room temperature curable epoxy resin adhesive composition as set forth in claim 13, wherein said diene rubber component is a polybutadiene.

16. The room temperature curable epoxy resin adhesive composition as set forth in claim 13, wherein said diene rubber component is a polychloroprene.

17. The room temperature curable epoxy resin adhesive composition as set forth in claim 13, wherein said diene rubber component is a polyisoprene.

* * * * *